US012413007B2

(12) United States Patent
Lambert et al.

(10) Patent No.: US 12,413,007 B2
(45) Date of Patent: Sep. 9, 2025

(54) ELECTRICAL ASSEMBLY

(71) Applicant: Lear Corporation, Southfield, MI (US)

(72) Inventors: Douglas A. Lambert, Clawson, MI (US); Bruce H. Pierik, Hazel Park, MI (US)

(73) Assignee: Lear Corporation, Southfield, MI (US)

( * ) Notice: Subject to any disclaimer, the term of this patent is extended or adjusted under 35 U.S.C. 154(b) by 457 days.

(21) Appl. No.: 18/084,991

(22) Filed: Dec. 20, 2022

(65) Prior Publication Data
US 2024/0204445 A1  Jun. 20, 2024

(51) Int. Cl.
*H01R 13/514* (2006.01)
*H01R 12/73* (2011.01)
*H01R 13/00* (2006.01)
*H01R 13/518* (2006.01)

(52) U.S. Cl.
CPC ......... *H01R 13/514* (2013.01); *H01R 12/732* (2013.01); *H01R 13/005* (2013.01); *H01R 2201/26* (2013.01)

(58) Field of Classification Search
CPC .... B60N 2/914; H01R 12/732; H01R 13/005; H01R 13/514; H01R 2201/26
USPC ......................................................... 439/717
See application file for complete search history.

(56) References Cited

U.S. PATENT DOCUMENTS

| | | | |
|---|---|---|---|
| 6,382,257 B2 * | 5/2002 | Mead | F15B 13/0817 700/282 |
| 7,397,668 B2 * | 7/2008 | Sekine | H01R 9/2608 361/728 |
| 7,704,100 B1 * | 4/2010 | McClellan | H01R 12/721 439/636 |
| 8,814,578 B2 | 8/2014 | Patel | |
| 8,961,201 B2 * | 2/2015 | Griese | H01R 9/2675 439/121 |
| 9,124,081 B2 * | 9/2015 | Kowtun | H02G 3/16 |
| 9,450,344 B2 * | 9/2016 | Cartier, Jr. | H01R 13/6598 |
| 10,128,618 B1 * | 11/2018 | Briant | H01R 13/04 |
| 10,879,643 B2 * | 12/2020 | Astbury | H01R 43/20 |
| RE48,517 E * | 4/2021 | De Carolis | H05K 7/1479 |
| 11,688,962 B2 * | 6/2023 | Alnarraie | H01R 12/732 439/65 |
| 11,757,221 B2 * | 9/2023 | Morgan | H01R 13/6315 439/65 |
| 2008/0280488 A1 | 11/2008 | Hartley | |
| 2009/0023320 A1 * | 1/2009 | De Carolis | H01R 9/2408 439/190 |

(Continued)

*Primary Examiner* — Abdullah A Riyami
*Assistant Examiner* — Thang H Nguyen
(74) *Attorney, Agent, or Firm* — Fishman Stewart PLLC

(57) ABSTRACT

An assembly includes a module including a housing having a first portion, a second portion including a projection, and a first interior cavity; and a circuit board disposed at least partially in the first interior cavity; and an additional module connected under tension with the module, the additional module including: an additional housing having a recess and an additional interior cavity; and an additional circuit board disposed at least partially in the additional interior cavity. The second portion of the housing may be disposed at least partially in the additional interior cavity. The projection of the housing may be disposed at least partially in the recess of the additional housing. The circuit board may be electrically connected to the additional circuit board.

20 Claims, 14 Drawing Sheets

(56) References Cited

U.S. PATENT DOCUMENTS

| | | | |
|---|---|---|---|
| 2009/0142970 A1* | 6/2009 | Patel | H01R 13/514 |
| | | | 439/712 |
| 2015/0333423 A1 | 11/2015 | Busch | |
| 2016/0134035 A1* | 5/2016 | Hewer | H01R 12/7005 |
| | | | 439/660 |
| 2019/0190193 A1* | 6/2019 | Bdeir | H01R 13/6205 |

* cited by examiner

ELECTRICAL ASSEMBLY

TECHNICAL FIELD

The present disclosure generally relates to electrical assemblies, including modules that may, for example, be utilized in connection with and/or incorporated into vehicles.

BRIEF DESCRIPTION OF THE DRAWINGS

While the claims are not limited to a specific illustration, an appreciation of various aspects may be gained through a discussion of various examples. The drawings are not necessarily to scale, and certain features may be exaggerated or hidden to better illustrate and explain an innovative aspect of an example. Further, the exemplary illustrations described herein are not exhaustive or otherwise limiting, and embodiments are not restricted to the precise form and configuration shown in the drawings or disclosed in the following detailed description. Exemplary illustrations are described in detail by referring to the drawings as follows:

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Figure 1:
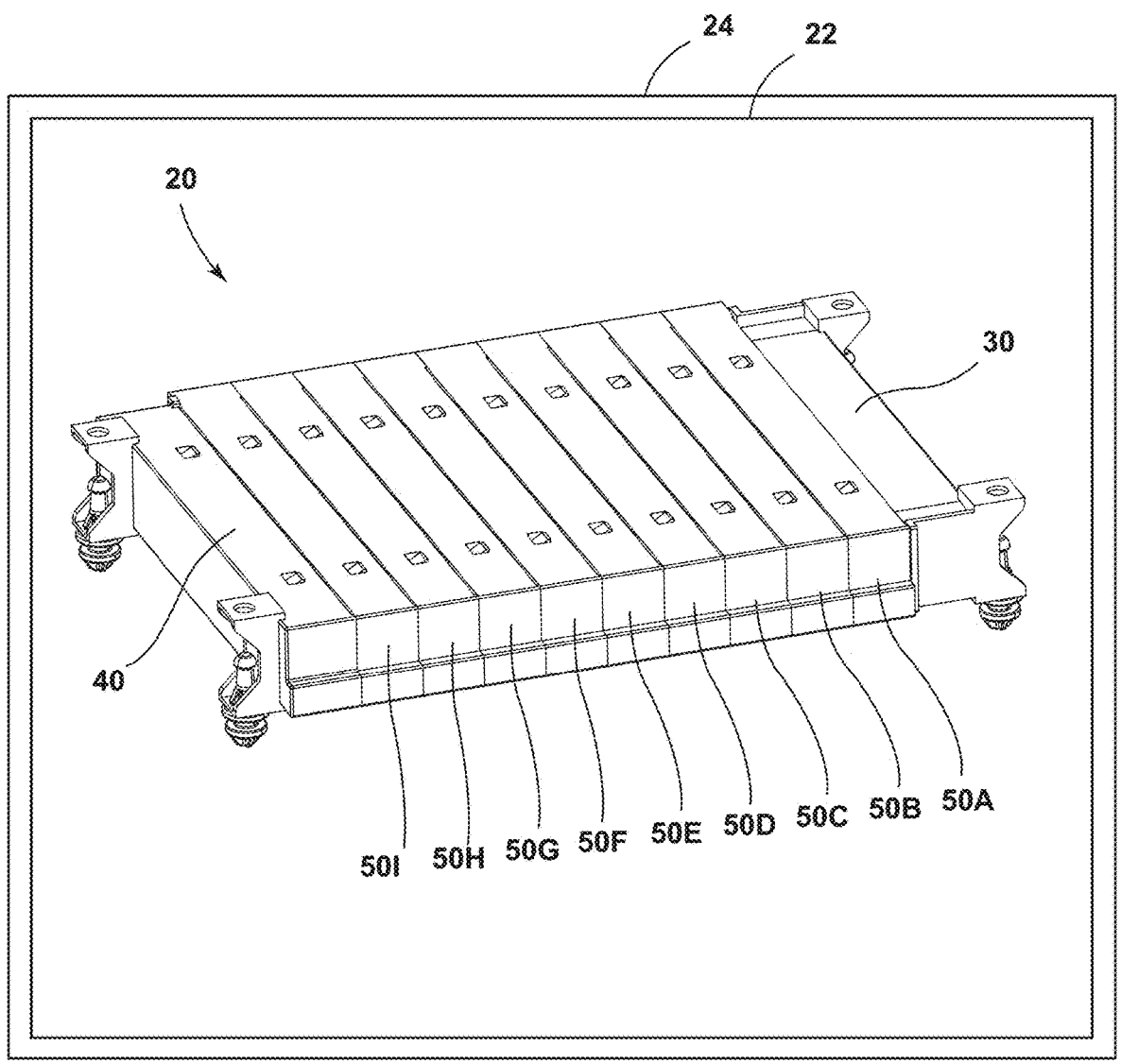
FIGS. 1 and 2 are perspective views generally illustrating an embodiment of an electrical assembly according to teachings of the present disclosure.
Figure 2:
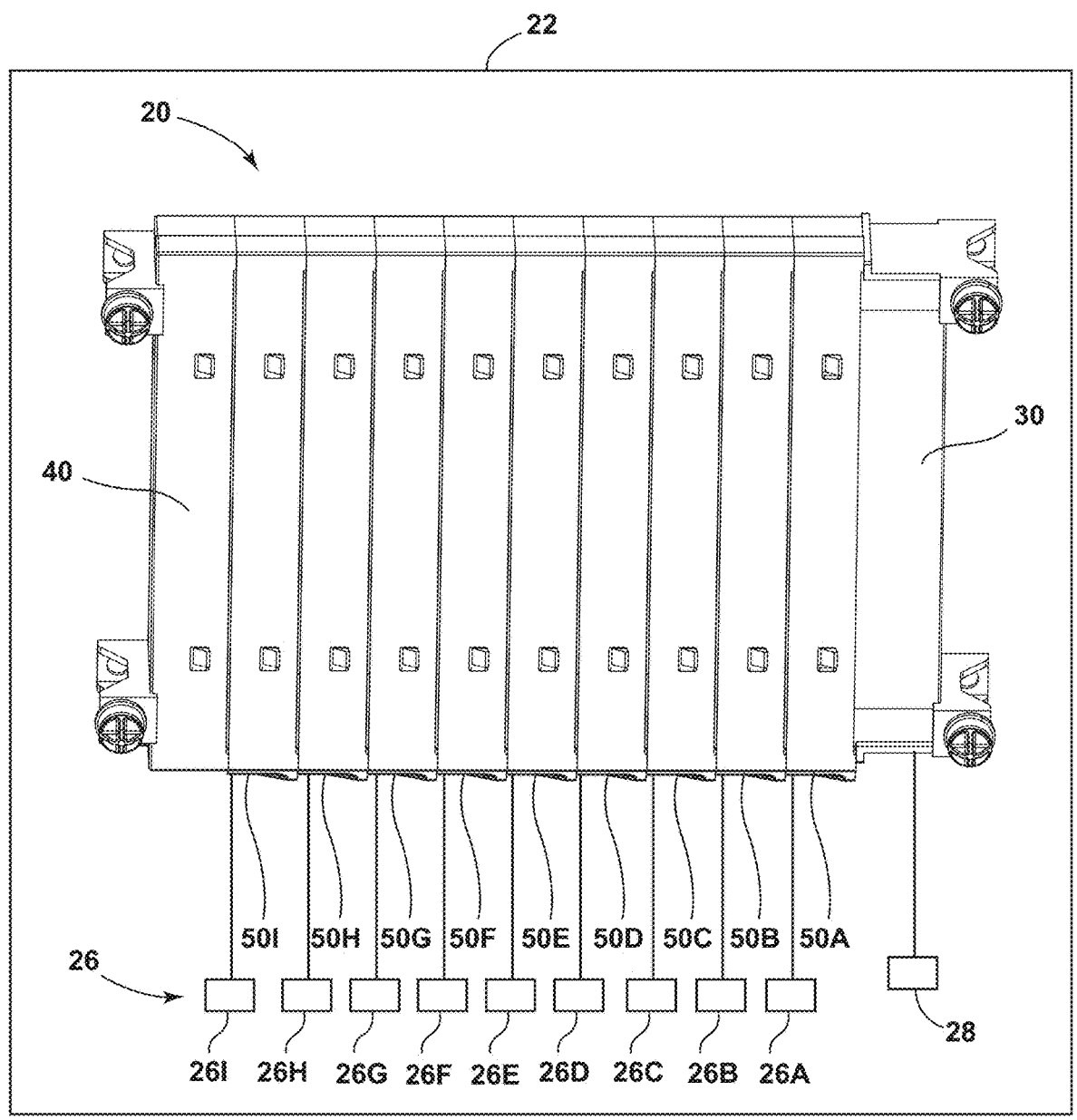

FIGS. 1 and 2 present an electrical assembly 20 including a first module 30, a second module 40, and/or a plurality of third modules 50 (e.g., third modules 50A-50I). The first module 30 is configured for connection with a third module 50. The second module 40 is configured for connection with a third module 50. A third module 50 is configured for connection with the first module 30, the second module 40, and/or one or more additional third modules 50. The first module 30, the second module 40, and/or the third module (s) 50 may be electrically connected. In some example configurations, the third module(s) 50 are disposed at least partially between the first module 30 and the second module 40. For example, the third module(s) 50 may be intermediate or additional modules, the first module 30 may be a first end module, and the second module 40 may be a second end module. Some or all of modules 30, 40, 50 (e.g., at least adjacent modules) are connected under tension. For example and without limitation, the first module 30 may be connected under tension with a third module 50 (e.g., third module 50A), the second module 40 may be connected under tension with the third module 50 and/or an additional third module 50 (e.g., third module 50I), and/or the third module 50 may be connected under tension with the first module 30, the second module 40, and/or an additional third module 50 (e.g., third module 50B).

With some embodiments, the assembly 20 may be used in connection with one or more bladders of a vehicle seat 22 of a vehicle 24. For instance, a module (e.g., modules 30, 40, 50) may include a bladder control module for a vehicle seat 22. A vehicle seat 22 may include the electrical assembly 20 and one or more fluid bladders 26 (e.g., fluid bladders/groups 26A-26I) in fluid communication with the electrical assembly 20. One or more of the modules 30, 50 may be configured to control fluid flow to and/or from a respective bladder 26 or group of bladders 26, such as to and/or from a fluid source 28 (e.g., a pump, tank, etc.). For example, one or more modules 30, 50 may include a fluid valve 68, 108 that may be controlled via electronics of the module 30, 50, such as via a circuit board 62, 102, a solenoid, expanding/contracting wires, and/or other electronics. The valves 68, 108 of adjacent modules 30, 50 are in fluid communication. For example, connecting adjacent modules 30, 50 may include connecting valves 68, 108 for fluid communication. The first module 30 may include an inlet port 76 that may be connected to the fluid source 28. The inlet port 76 may be in fluid communication with the fluid valve 68.

Examples of an electrical assembly 20 are shown including nine third modules 50, however the assembly 20 may include more or less than nine third modules 50 (e.g., an electrical assembly 20 may have a modular configuration). For example, some configurations may include one third module 50 and other configurations may include, two, three, four, five, or other numbers of third modules 50. The number of third modules 50 may correspond to the number of components (e.g., bladders, fluid actuators, etc.) to be controlled.

Figure 3A:
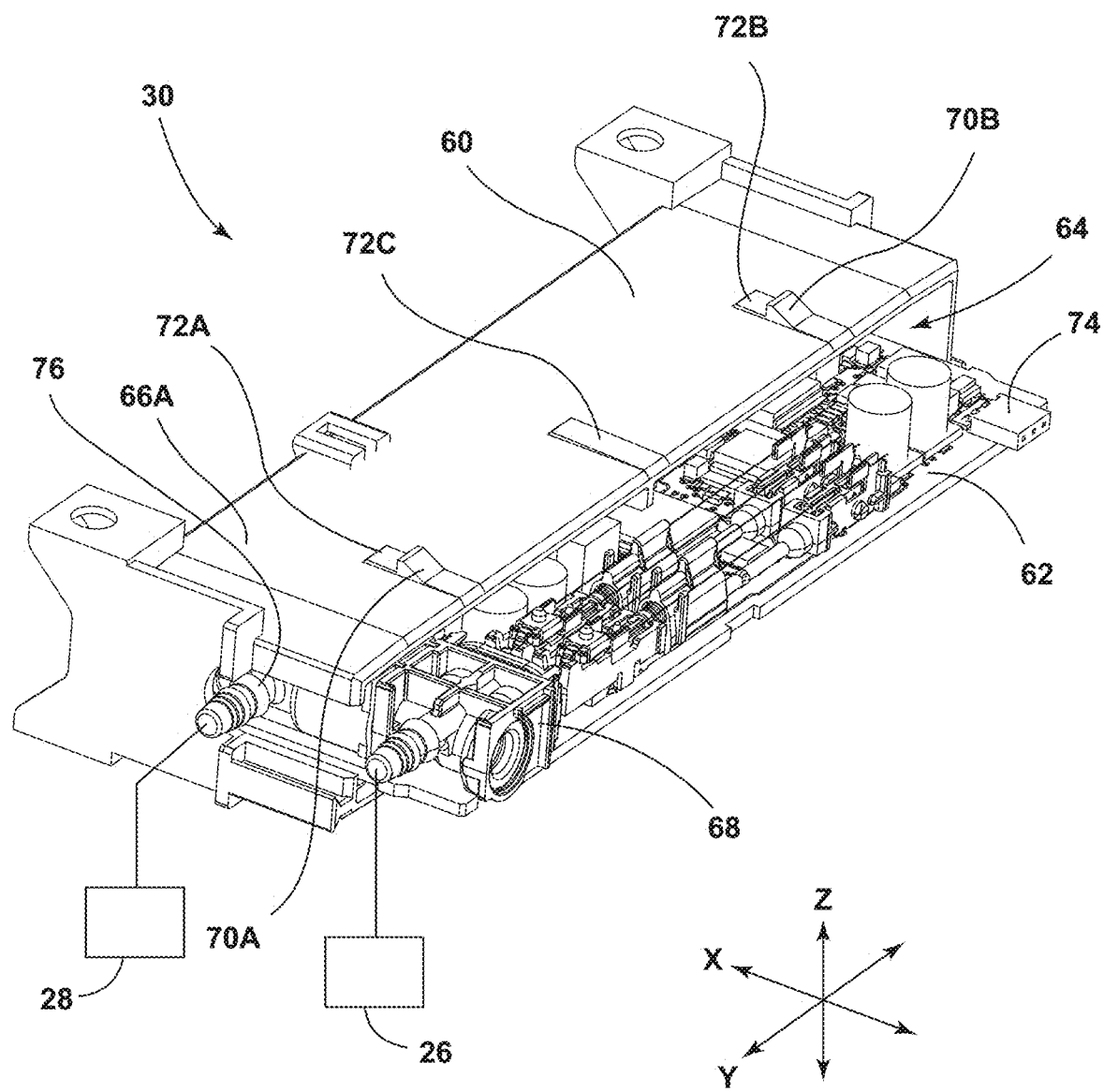
FIGS. 3A, 3B, and 4 are perspective views general illustrating an embodiment of a first module according to teachings of the present disclosure.
Figure 3B:
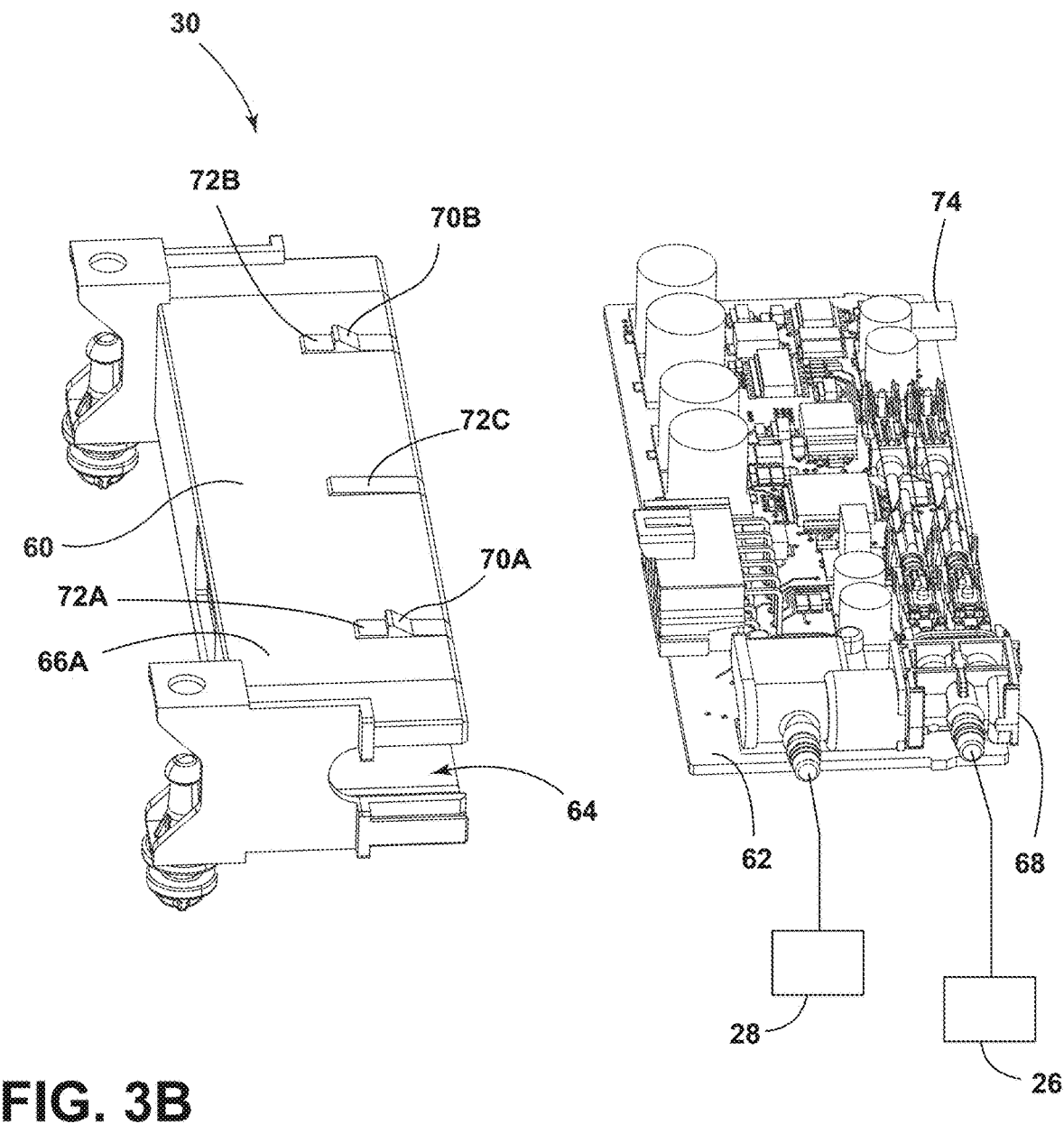
Figure 4:
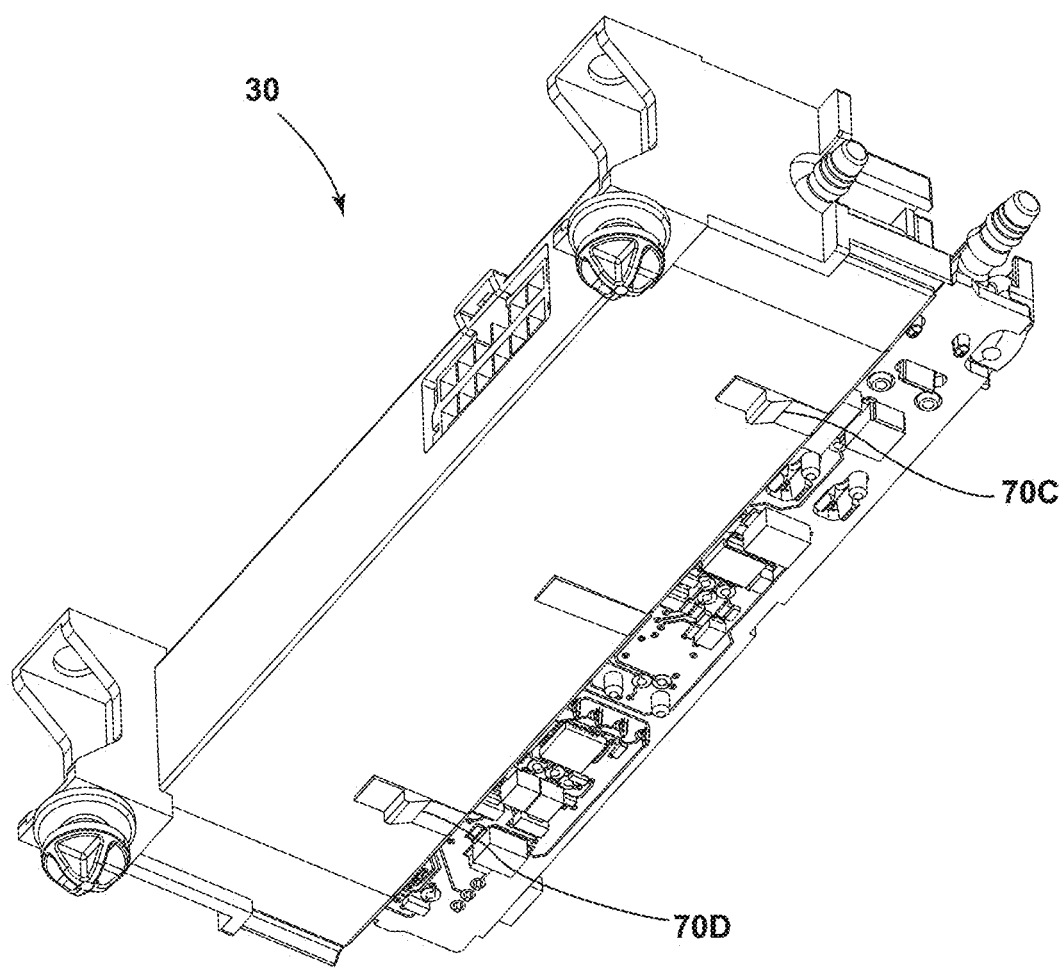

FIGS. 3A, 3B, and 4 illustrate a first module 30 including a housing 60 and a circuit board 62. The housing 60 includes an interior cavity 64 and the circuit board 62 is disposed at least partially in the interior cavity 64. The housing 60 includes one or a plurality of projections 70 (e.g., projections 70A-70D) and/or one or a plurality of ramped portions 72 (e.g., ramped portions 72A-72F). A first projection 70A and a second projection 70B may extend from a first side wall 66A of the housing 60 (e.g., an upper wall) and/or a third projection 70C and a fourth projection 70D may extend from a second sidewall 66B of the housing 60 (e.g., a lower wall).

A projection 70 may include a ramped configuration. The housing 60 is shown including four projections 70, however the housing 60 may include more or less than four projections 70. In some implementations, one or more ramped portions (e.g., ramped portions 72A-72C) extend from the first sidewall 66A of the housing 60, and/or one or more ramped portions (e.g., ramped portions 72D-72F) extend from the second sidewall 66B of the housing 60. A ramped portion 72 is configured to provide an interference fit with an adjacent module (e.g., a third module 50). The housing 60 is shown including six ramped portions 72, however the housing 60 may include more or less than six ramped portions 72. The housing 60 may comprise one or more materials that are configured to deform (e.g., stretch, bend, flex, etc.), at least to some degree, during assembly, such as one or more plastics and/or polymers. In some examples, the circuit board 62 includes an electrical connector 74 that connects to an electrical connector of an adjacent module (e.g., an adjacent third module 50).

Figure 5:
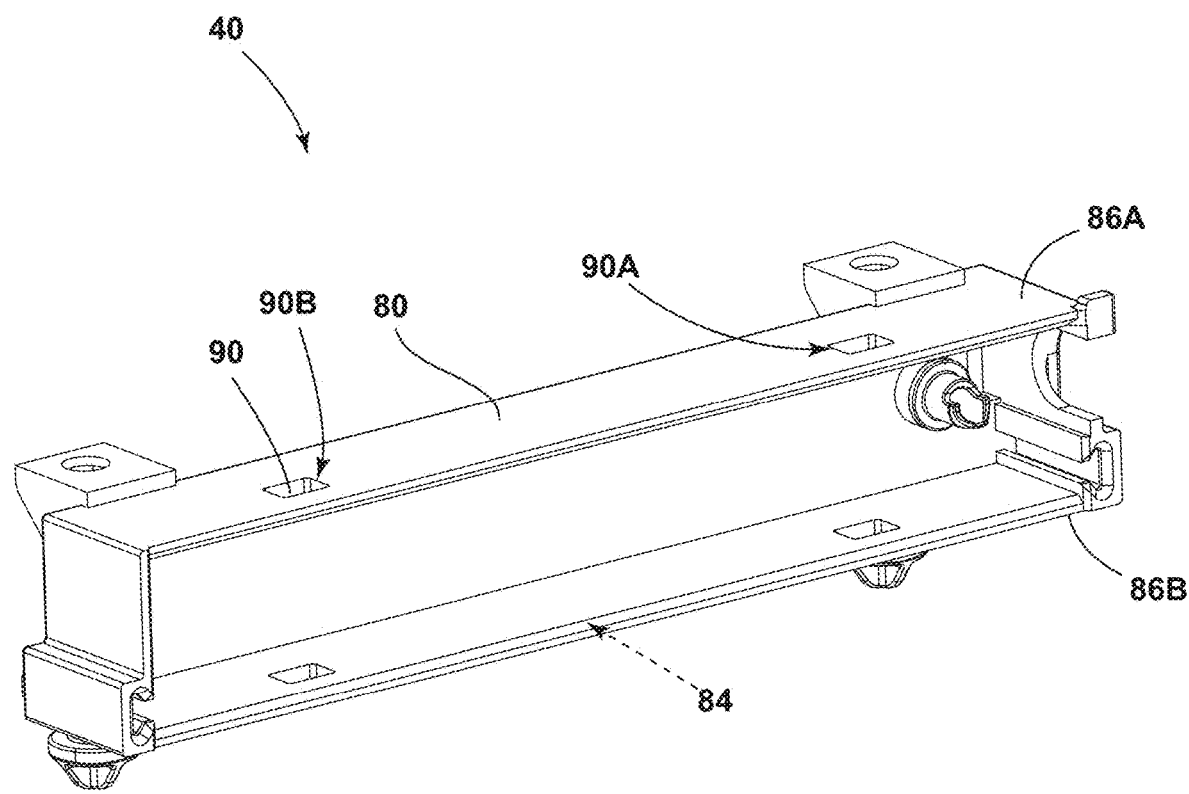
FIGS. 5 and 6 are perspective views general illustrating an embodiment of a second module according to teachings of the present disclosure.
Figure 6:
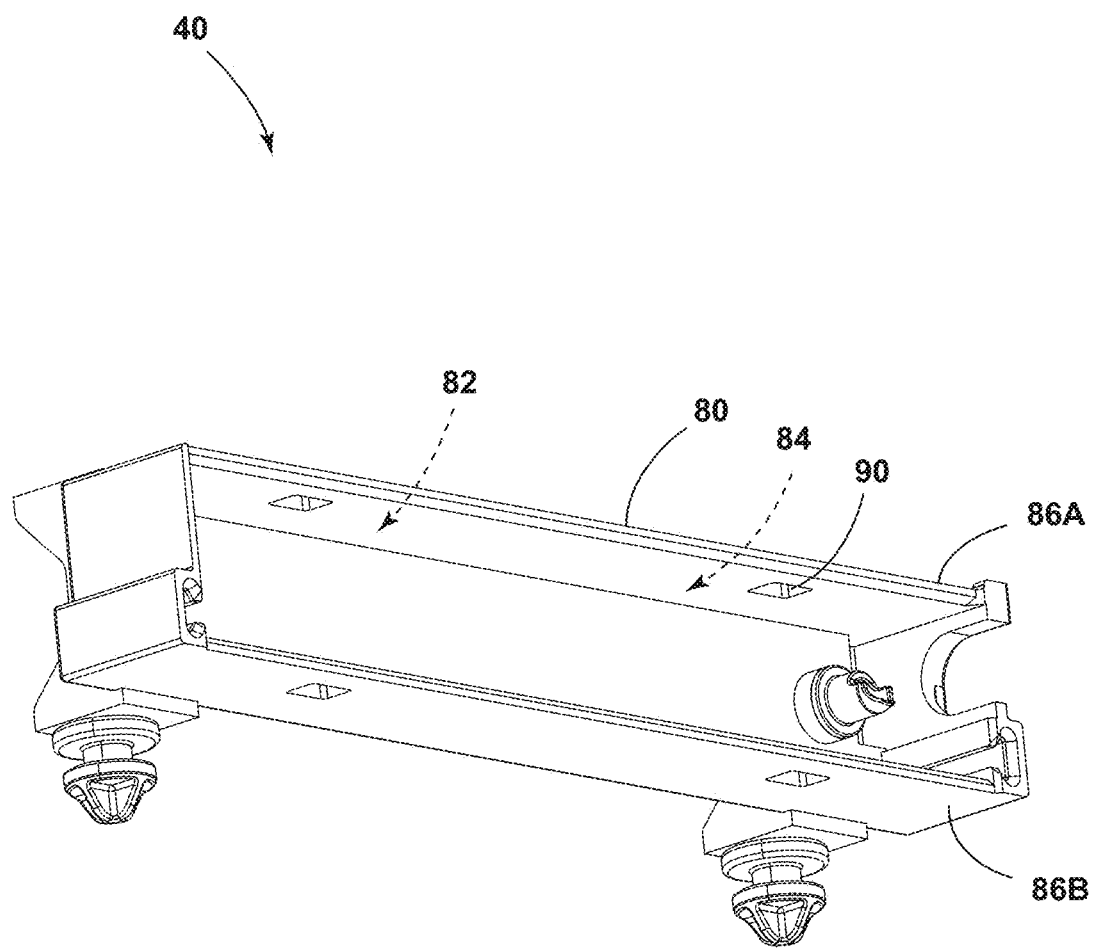

FIGS. 5 and 6 illustrate a second module 40 including a housing 80 having an interior cavity 84. In some configurations, the housing 80 includes a plurality of recesses 90 (e.g., recesses 90A-90D). A first recess 90A and a second recess 90B may be disposed in a first sidewall 86A of the housing 80 (e.g., an upper wall) and/or a third recess 90C and a fourth recess 90D may be disposed in a second sidewall 86B of the housing 80 (e.g., a lower wall). The housing 80 is shown including four recesses 90, however the housing 80 may include more or less than four recesses 90. The housing 80 may comprise one or more materials that are configured to deform (e.g., stretch, bend, flex, etc.), at least to some degree, during assembly, such as one or more plastics and/or polymers. Optionally, the second module 40 includes a circuit board at least partially disposed in the interior cavity 84. The circuit board may include an electrical connector that connects to an electrical connector of an adjacent module. In other configurations, the second module 40 does not include a circuit board or other components and functions as a cover for an adjacent third module 50.

Figure 7:
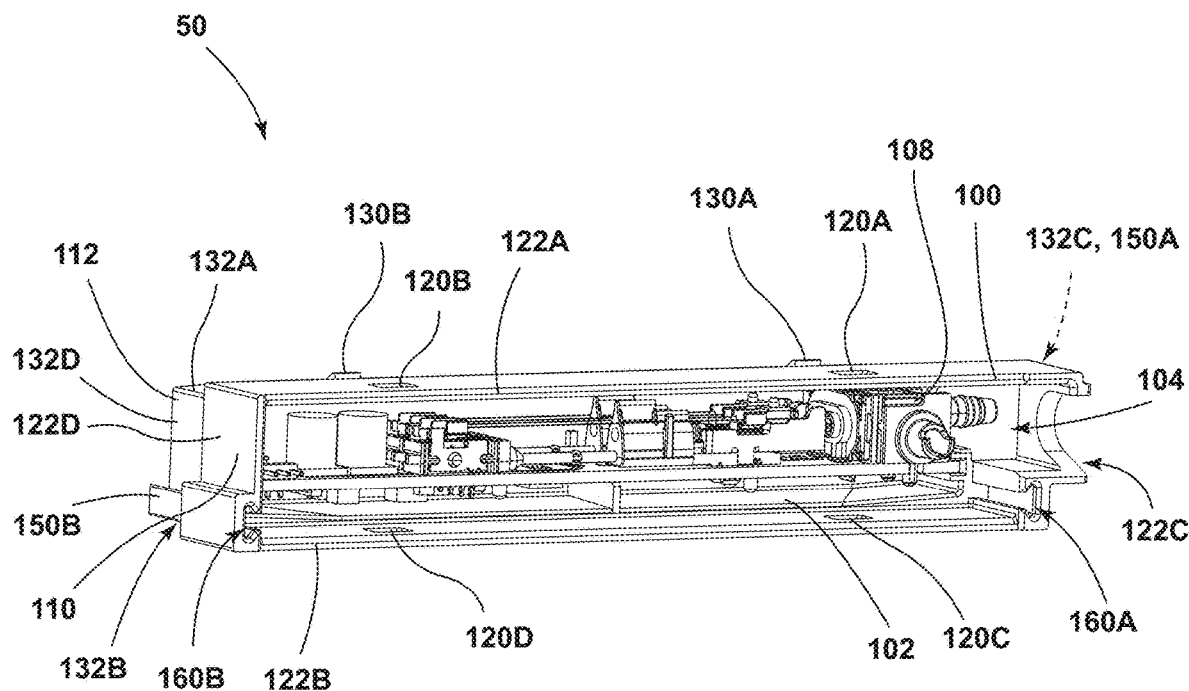
FIGS. 7 and 8 are perspective views general illustrating an embodiment of a third module according to teachings of the present disclosure.
Figure 8:
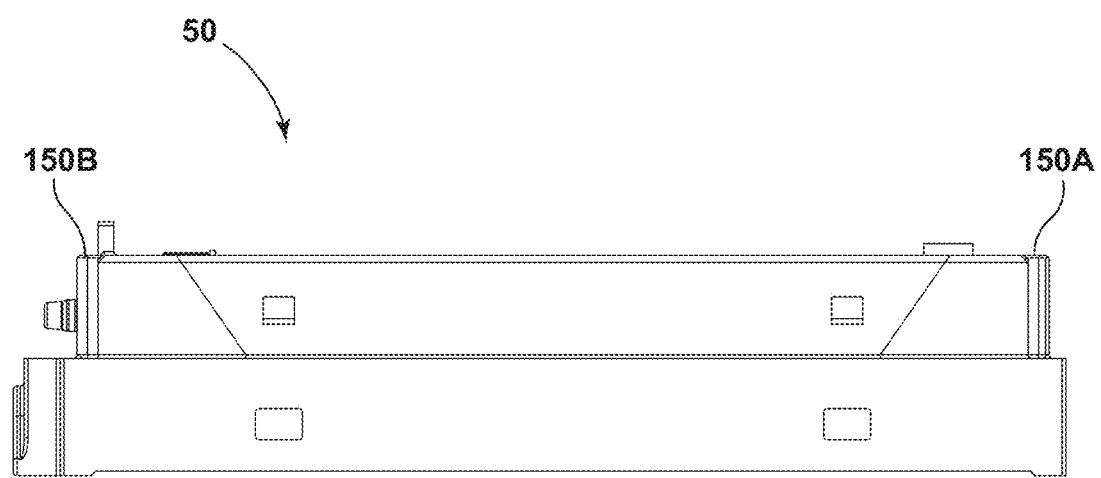

FIGS. 7 and 8 illustrate a third module 50 including a housing 100 and a circuit board 102. The housing 100 includes an interior cavity 104 and the circuit board 102 is disposed at least partially in the interior cavity 104. The housing 100 includes a first portion 110 and a second portion 112 offset from the first portion 110 in an assembly direction (e.g., an X-direction). The first portion 110 may be larger than the second portion 112. In some configurations, the first portion 110 includes a plurality of recesses 120 (e.g., recesses 120A-120D). A first recess 120A and a second recess 120B may be disposed in a first sidewall 122A of the first portion 110 (e.g., an upper wall) and/or a third recess 120C and a fourth recess 120D may be disposed in a second sidewall 122B of the first portion 110 (e.g., a lower wall). The housing 100 is shown including four recesses 120, however the housing 100 may include more or less than four recesses 120. The number of recesses 120 may correspond to the number of projections 70 of the first module 30.

In some implementations, the second portion 112 of the housing 100 includes a plurality of projections 130 (e.g., projections 130A-130D). A first projection 130A and a second projection 130B may extend from a first sidewall 132A of the second portion 112 (e.g., an upper wall) and/or a third projection 130C and a fourth projection 130D may extend from a second sidewall 132B of the second portion 112 (e.g., a lower wall). A projection 130 may include a ramped configuration. The housing 100 is shown including four projections 130, however the housing 100 may include more or less than four projections 130. The housing 100 may comprise one or more materials that are configured to deform (e.g., stretch, bend, flex, etc.), at least to some degree, during assembly, such as one or more plastics and/or polymers. In some examples, the circuit board 102 includes at least one electrical connector 134, 136. An electrical connector 134, 136 connects to an electrical connector of an adjacent module. For example, an electrical connector 136A of a third module 50A may connect with an electrical connector 134B of an adjacent third module 50B. Additionally or alternatively, an electrical connector 134A may connect with an electrical connector 74 of the first module 30. In some configurations, the electrical connectors 134, 136 may provide power and/or data/instructions from the first module 30 to the one or more third modules 50.

Figure 9:
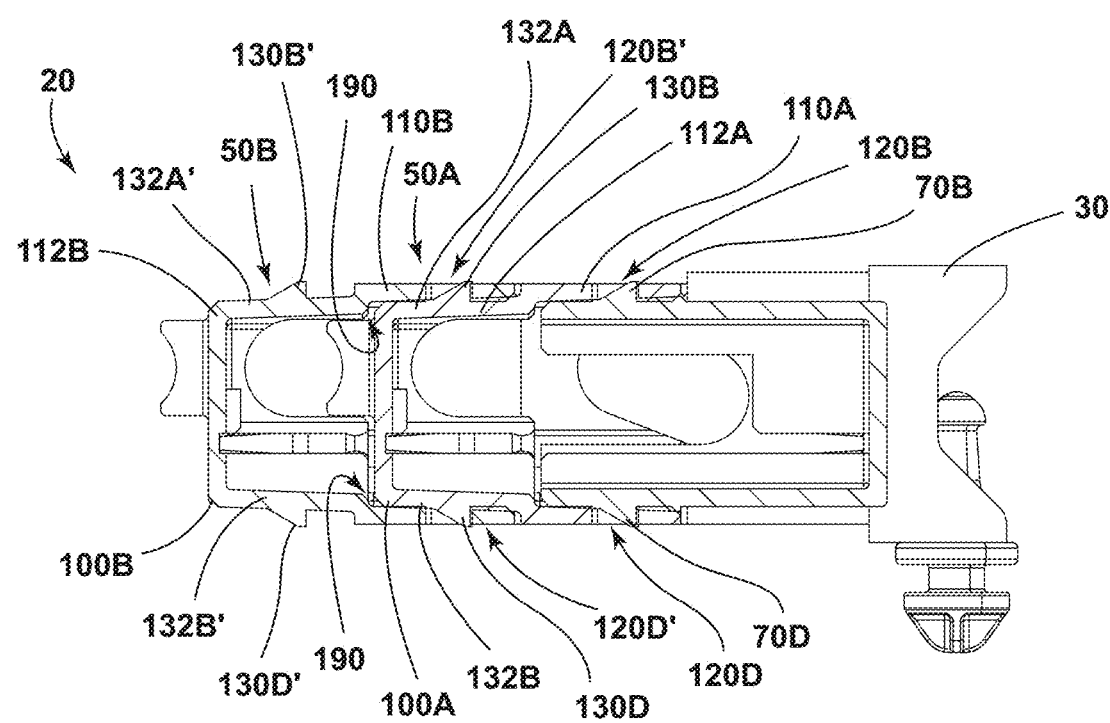
FIG. 9 is a cross-sectional view generally illustrating an embodiment of an electrical assembly according to teachings of the present disclosure.

With reference to FIG. 9, a first module 30 and two third modules 50A-B are shown. In some configurations, a housing 100 of a third module 50 includes a first sidewall 132A and/or a second sidewall 132B that are tapered, such as to provide an interference fit with an adjacent module. For example, a Z-dimension of the second portion 112 of the housing 100 may increase in the X-direction, such as toward the first module 30. In some implementations, the first sidewall 132A and/or the second sidewall 132B may include tapered edges to facilitate insertion of an adjacent module 30, 50.

Figure 10:
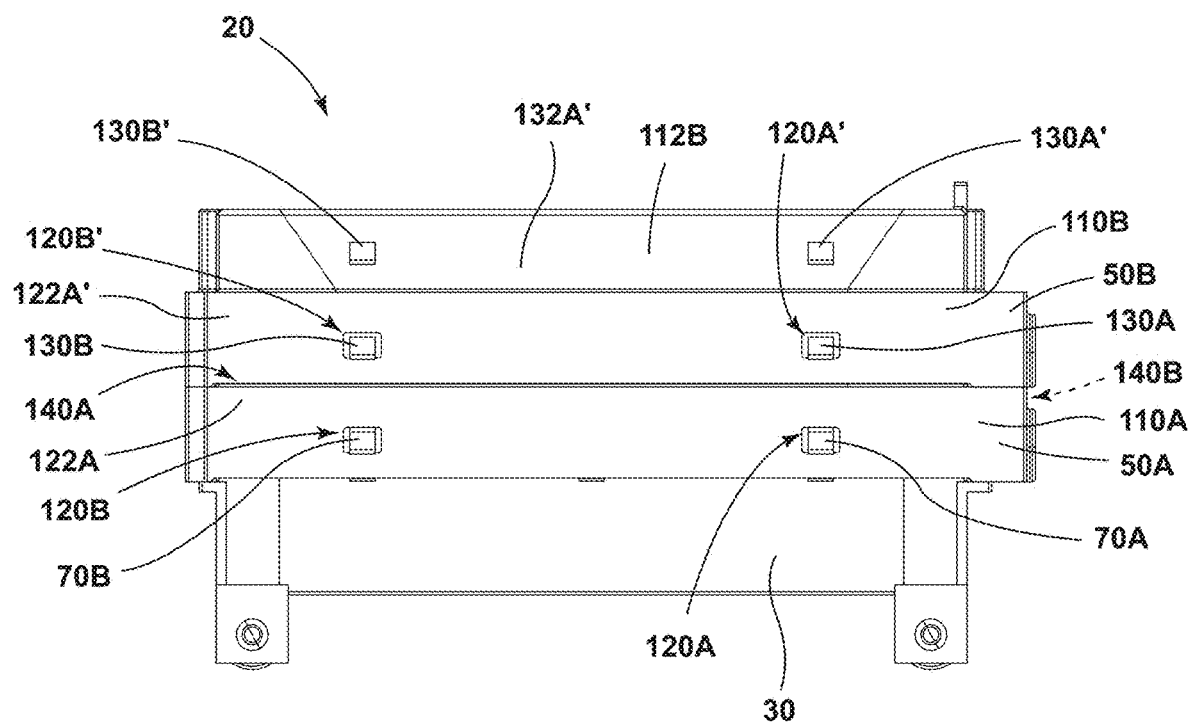
FIG. 10 is a top view generally illustrating an embodiment of an electrical assembly according to teachings of the present disclosure.

Referring now to FIG. 10, a first sidewall 122A and/or a second sidewall 122B of a housing 100 includes a recessed portion 140 (e.g., recessed portion 140A, 140B) such that a gap/clearance is disposed between sections of adjacent modules. For example and without limitation, a third module 50A may be connected with an additional third module 50B such that a recessed portion 140A is disposed between a first sidewall 122A of the third module 50A and a first sidewall 122A' of the additional third module 50B. Additionally or alternatively, a recessed portion 140B is disposed between a second sidewall 122B of the third module 50A and a second sidewall 122B' of the additional third module 50B. The recessed portions 140A-B may result in reduced contact in the X-direction between adjacent sidewalls 122A, 122A' and 122B, 122B'. For example, the recessed portions 140 may extend along at least 70% of the sidewalls 122A, 122A' and contact in the X-direction between sidewalls 122A, 122A' may be along 30% or less of their Y-dimension lengths. A depth of the recessed portions 140 in the X-direction may correspond to an offset 170 between adjacent modules described below. For example, the depth of the recessed portions 140 may be at least as great as the offset 170, which may facilitate connecting adjacent modules (e.g., third modules 50A, 50B), such as by providing room for stretching of the sidewalls.

Figure 12:
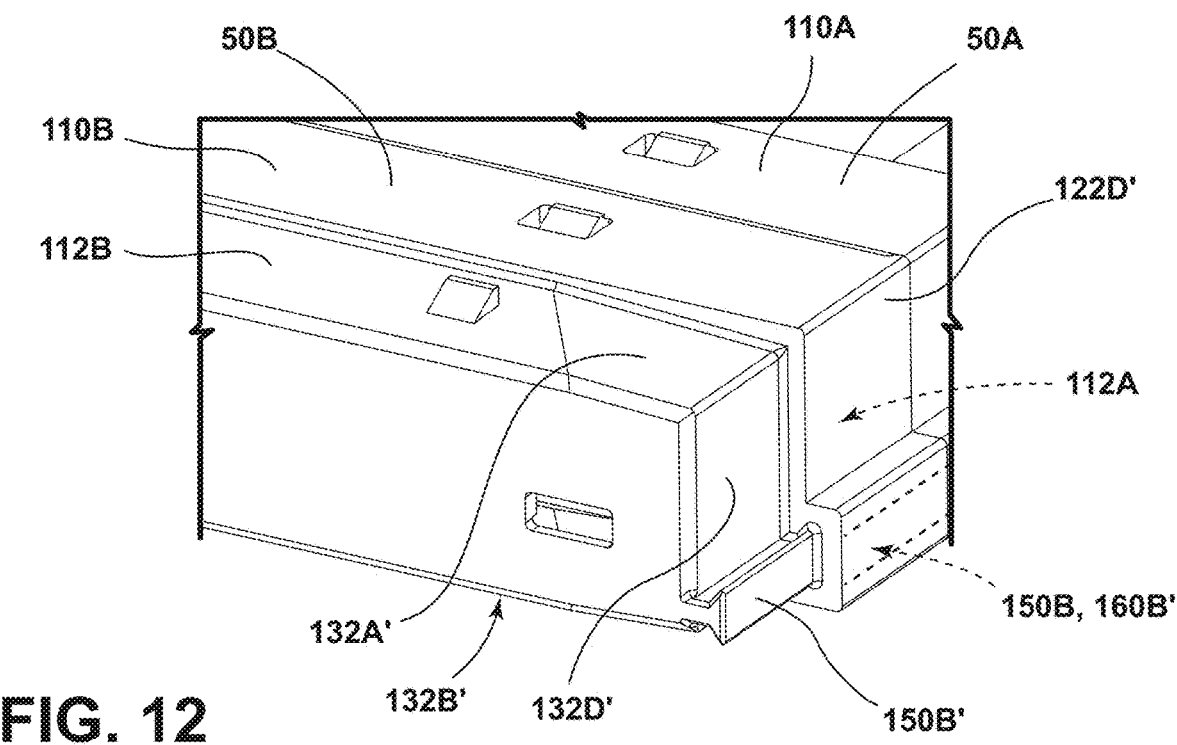
FIG. 12 is a partial perspective view generally illustrating an embodiment of an electrical assembly according to teachings of the present disclosure.

With reference to FIGS. 7 and 12, a housing (e.g., housings 60, 80, 100) may include at least one track 150 and/or at least one channel 160. For example and without limitation, a second portion 112 portion of a housing 100 may include at least one track 150 and a first portion 110 of the housing 100 may include at least one channel 160. In some implementations, a third sidewall 132C of the second portion 112 may include a first track 150A and a fourth sidewall 132D of the second portion 112 may include a second track 150B. A third sidewall 122C of the first portion 110 may include a first channel 160A and a fourth sidewall 122D of the first portion 110 may include a second channel 160B. A track 150 may include a dovetail-shaped configuration. A channel 160 may include a shape that corresponds to a shape of a track 150. In an assembled configuration, a module (e.g., third module 50A) may be connected with an adjacent module (e.g., third module 50B) such that a track 150 of the module is disposed in and/or engaged with a channel 160 of the adjacent module (see, e.g., FIG. 12). Engagement between a track 150 of a module and channel 160 of an adjacent module may restrict and/or prevent relative movement between the two modules in the Y-direction and the Z-direction, and may not substantially restrict movement in the X-direction.

With reference to FIGS. 1, 2, 9, and 10, in an assembled configuration, adjacent modules are connected under tension. For example and without limitation, the first module 30 may be connected under tension with a third module 50 (e.g., third module 50A), the second module 40 may be connected under tension with the third module 50A and/or an additional third module 50 (e.g., third module 50I), and/or the third module 50 may be connected under tension with the first module 30, the second module 40, and/or an additional third module 50 (e.g., third module 50B).

In some implementations, the first module 30 is connected with a third module 50A such that a portion of the first module 30 is disposed at least partially in an interior cavity 104A of the third module 50A, a projection 70 of the first module 30 is disposed at least partially within a recess 120 of the third module 50A, and/or a circuit board 62 of the first module 30 is electrically connected with a circuit board 102A of the third module 50A via electrical connectors 74, 134.

In some instances, the third module 50A may be connected with an additional third module 50B such that a second portion 112A of a housing 100A of the third module 50A is at least partially disposed in an interior cavity 104B of the additional third module 50B. A projection 130 of the third module 50A is at least partially disposed within a recess 120' of the additional third module 50B. The electrical connector 134B of the third module 50B is connected (e.g., directly) to the electrical connector 134A of the third module 50 such that the circuit board 102A of the third module 50A is electrically connected with a circuit board 102B of the additional third module 50B (see, e.g., FIG. 13).

Figure 11:
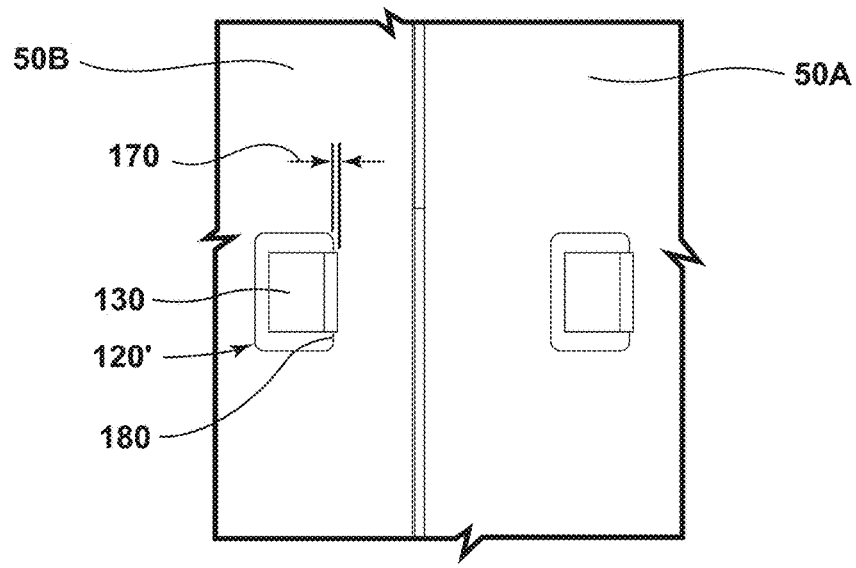
FIG. 11 is a partial top view generally illustrating an embodiment of an electrical assembly according to teachings of the present disclosure.

Referring now to FIG. 11, the third module 50A may be connected under tension with the additional third module 50B at least in part because of a pre-assembly/flex offset 170 between a projection 130 of the third module 50A and a surface 180 defining a recess 120' of the additional third module 50B. The offset 170 may be the X-direction distance between the projection(s) 70, 130 of one module 30, 50 and the recess(es) 90, 120 of the adjacent module 40, 50 when the one module is fully inserted into the adjacent module. For example, when one module 30, 50 is fully inserted into the adjacent module 40, 50, the projection(s) 70, 130 may not be aligned with the recess(es) 90, 120. The housing 80, 100 of the adjacent module 40, 50 may then be stretched at least the distance of the offset such that projection(s) and the recess(es) 90, 120 are aligned for engagement. The pre-assembly/flex offset may, for example and without limitation, be approximately 0.2 mm to 0.3 mm.

In some examples, the second module 40 may be connected with a third module 50 such that a second portion 112 of a housing 100 of the third module 50 is at least partially disposed within an interior cavity 84 of the second module 40. A projection 130 of the third module 50 is at least partially disposed within a recess 90 of the second module 40. If the second module 40 includes a circuit board, the circuit board may be electrically connected with a circuit board 102 of the third module 50.

Figure 13:
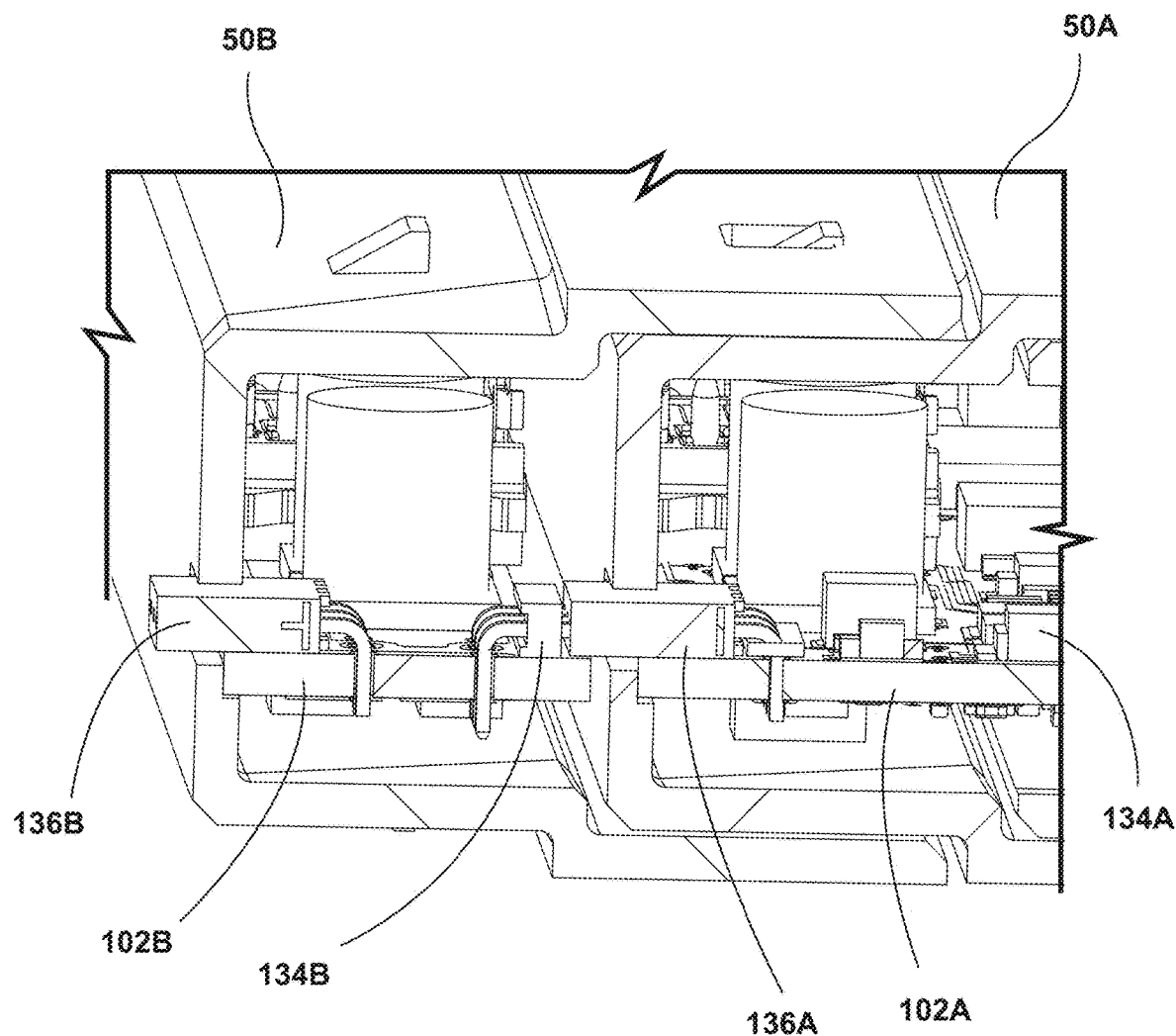
FIG. 13 is a partial cross-sectional view generally illustrating an embodiment of an electrical assembly according to teachings of the present disclosure.

Adjacent modules 30, 50 are connected under tension such that electrical connectors 74, 134 of the adjacent modules 30, 50 are connected under tension which restricts movement between the electrical connectors 74, 134, so that the adjacent modules 30, 50 do not become unintentionally disconnected and wear/fretting of the electrical connectors 74, 134 is limited. For example and without limitation, as shown in FIG. 13, a third module 50A may be connected with an additional third module 50B such that an electrical connector 134A of the third module 50A is connected under tension with an additional electrical connector 134B of the additional module 50B and/or a circuit board 102A of the third module 50A is electrically connected with an additional circuit board 102B of the additional third module 50B.

In one example assembled configuration, a first module 30 (e.g., a first end module) is disposed partially in a third module 50A (e.g., a first additional module), the third module 50A is disposed partially in another third module 50B (e.g., a second additional module), and/or the another third module 50B is partially disposed in yet another third module 50C (e.g., a third additional module) or the second module 40 (e.g., a second end module).

A method of assembling an electrical assembly 20 includes connecting at least two modules 30, 40, 50 together. In configurations with one third/intermediate module 50, the third module 50 is connected with a first module 30 (e.g., a first end module) and a second module 40 (e.g., a second end module). Connecting the third module 50 with the first module 30 includes inserting a portion of the first end module 30 into the first portion of the housing 100 of the third module. Insertion may continue until the housing 100 contacts the projections 70 and/or the ramped portions 72 of the housing 60 of the first end module 30. An offset 170 between the projections 70 of the housing 60 and the recesses 120 of the housing 100 may result in the projections 70 not initially engaging the recesses 120. The housing 100 may then be stretched in the X-direction (e.g., to compensate for the offset 170) such that the recesses 120 extend at least to the end of the projections 70 and the projections 70 can be inserted into/engaged with the recesses 120. Once the projections 70 are inserted into/engaged with the recesses 120, the housing 100 may be released from being stretched and may move/retract toward its original position (e.g., due to a resiliency of the material(s) of the housing 100), but may not move/retract completely its original position, which may result in the housings 60, 100 being connected under tension of the still partially stretched housing 100. This tension biases the housings 60, 100 toward each other and limits and/or substantially prevents relative movement therebetween. During insertion and/or stretching of the housing 100 in the X-direction, the housing 100 may also be stretched and/or deformed in the Z-direction. For example, the outer dimensions of the housing 60 (e.g., proximate the projections 70 and/or ramped portions 72) may be similar to or even at least slightly larger than the inner dimensions of the first portion 110 of the housing 100 (e.g., in the Z-direction) such that the first portion 110 deflects outward at least to some degree, which may cause the first portion 110 to apply a Z-direction force to the housing 60 (e.g., resulting from the resiliency of material(s) of the housing 100). This deflection and force may result in the housings 60, 100 be connected under tension in two directions, the X-direction and the Z-direction. The ramped portions 72 may enhance/promote deflection of the first portion 110 in the Z-direction, which may increase the tension between adjacent modules.

In configurations with a single third/intermediate module 50, the second module 40 is connected to the opposite side of the third module 50 from the first module. The connection process may be similar to the connection of the third module 50 with the first module 30. For example, the second portion 112 of the third module 50 may be inserted into the interior cavity 84 of the second module 40 and the housing 80 may be stretched in the X-direction and/or the Z-direction to allow the projections 130 of the third module 50 to be inserted into the recesses 90 of the second module 40. The housing 80 may be released from stretching forces, but may not fully return to its original position/shape such that the housings 80, 100 are connected under tension. For example, a sidewall 122A may be stretched from an original position to a stretched position, and, once released, may move back toward its original position to an engaged position between the original position and the stretched position.

Figure 14:
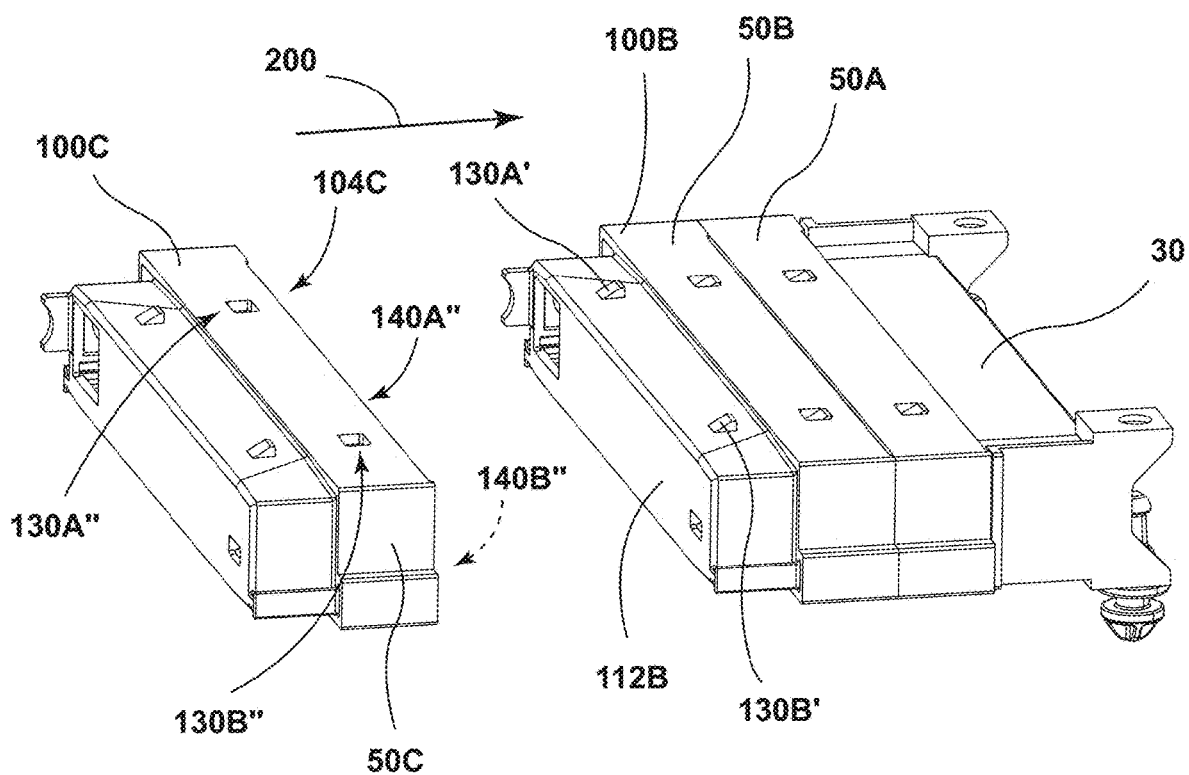
FIG. 14 is a perspective view generally illustrating an embodiment of a method of assembling an electrical assembly according to teachings of the present disclosure.

FIG. 14 illustrates a method of connecting two third/intermediate modules 50 of an electrical assembly 20 that includes a plurality of third/intermediate modules 50. The third modules 50 may be connected to each other in a similar manner as the first module 30 and the adjacent third module 50 described above. A third module (e.g., third module 50C) may be connected to an adjacent module (e.g., third module 50B) such that the module is connected under tension to the adjacent module. Connecting the adjacent modules may include moving one module in an assembly direction 200 (e.g., parallel to the X-axis) such that a portion of the adjacent module (e.g., second portion 112B) is disposed in an interior cavity (e.g., interior cavity 104C) of the module. Connecting two modules may include manipulating (e.g., stretching) a housing of the module (e.g., housing 100C) in a vertical direction (e.g., parallel to the Z-axis) and a horizontal direction (e.g., parallel to the X-axis) such that a projection (e.g., projections 130A'-130D') of the adjacent module is disposed within a recess (e.g., recesses 120A"-120D") of the housing of the module and the module is connected under the tension to the adjacent module. In some instances, one or more additional recesses (e.g., 140A" and 140B") of the housing helps facilitate the manipulation of the housing over the additional housing (e.g., housing 100B) of the adjacent module. In some examples, prior to the manipulation, the housing is in a first position, during the manipulation the second housing deforms (e.g., is "stretched") to a second position, and when released from the deformation, the second housing moves to a third position which is different than the first position.

In at least some assembled configurations, each of the modules 30, 40, 50 may be at least indirectly connected under tension with each other module 30, 40, 50 of an electrical assembly. For example and without limitation, the first module 30 may be indirectly connected under tension with the second module 40 via one more third/intermediate modules 50.

In some implementations, the third module 50A is connected with the additional third module 50B such that a gap 190 in the Z-direction is disposed between the first and second sidewalls 132A', 132B' of the housing 100B of the additional third module 50B and ends of the first and second sidewalls 132A, 132B of the housing 100A of the third module 50A (see, e.g., FIG. 9). The gap 190 may, for example and without limitation, be triangular.

While examples are described with inserted portions of modules 30, 50 including projections 70, 130 received by recesses 90, 120 of a receiving portion of a module 40, 50, such a configuration may be reversed and/or mixed such that inserted portions of modules include recesses or recesses and projections.

This disclosure includes, without limitation, the following embodiments:

1. An assembly, comprising: a module including: a housing having a first portion, a second portion including a projection, and a first interior cavity; and a circuit board disposed at least partially in the first interior cavity; and an additional module connected under tension with the module, the additional module including: an additional housing having a recess and an additional interior cavity; and an additional circuit board disposed at least partially in the additional interior cavity; wherein the second portion of the housing is disposed at least partially in the additional interior cavity; the projection of the housing is disposed at least partially in the recess of the additional housing; and the circuit board is electrically connected to the additional circuit board.

2. The assembly according to embodiment 1, wherein the projection extends from a first side of the housing; the housing includes a second projection that extends from a second side of the housing; and the projection and the second projection include a ramped configuration.

3. The assembly according to any preceding embodiment, wherein the housing includes a ramped portion to provide an interference fit with the additional housing.

4. The assembly according to any preceding embodiment, wherein the projection is disposed on the ramped portion.

5. The assembly according to any preceding embodiment, wherein the additional housing includes an additional housing first portion having the recess and an additional housing second portion having an additional housing projection.

6. The assembly according to any preceding embodiment, wherein the additional housing includes a first sidewall and a second sidewall; and the first sidewall and the second sidewall of the additional housing include tapered edges.

7. The assembly according to any preceding embodiment, wherein the first sidewall and the second sidewall of the additional module include an additional recess such that in an assembled configuration a gap/clearance is disposed between sections of adjacent modules.

8. The assembly according to any preceding embodiment, wherein the housing of the module includes a track; and the first portion of the additional housing includes a channel engaged with track such that relative movement of the module and the additional module is restricted in a lateral direction and a vertical direction.

9. The assembly according to any preceding embodiment, wherein the module is a first end module; the assembly further comprises a second end module; the additional module is disposed at least partially between the first end module and the second end module; the second end module includes a second end module housing having a second end module recess and a second end module interior cavity; and the second end module is connected, at least indirectly, with the additional module.

10. The assembly according to any preceding embodiment, wherein the first end module and the second end module are connected, at least indirectly, under tension with the additional module.

11. The assembly according to any preceding embodiment, wherein the additional housing includes an additional housing first portion having the recess and an additional housing second portion having an additional housing projection; and the second portion of the additional housing is at least partially disposed in the second end module interior cavity.

12. The assembly according to any preceding embodiment, including a second additional module connected under tension with one or both of the additional module and the second end module.

13. The assembly according to any preceding embodiment, wherein the second additional module and the additional module are connected under tension via a pre-assembly offset between the projection of the additional module and a second additional module recess of the second additional module.

14. The assembly according to any preceding embodiment, wherein the first end module, the additional module, and the second additional module are electrically connected.

15. The assembly according to any preceding embodiment, wherein the first end module, the additional module, and the second additional module include respective fluid valves that are in fluid communication with each other.

16. The assembly according to any preceding embodiment wherein walls of the additional module and the second additional module include recessed portions that facilitate stretching.

17. The assembly according to any preceding embodiment, wherein the additional module includes an additional module projection; the second additional module includes a second additional module recess; and a depth of the recessed portions corresponds to an offset of the additional module projection and the second additional module recess.

18. The assembly according to any preceding embodiment, wherein the second additional module includes a second additional module housing; the second additional module housing includes a first sidewall and a second sidewall; and the first sidewall and the second sidewall of the second additional module housing include tapered edges.

19. The assembly according to any preceding embodiment, wherein the first end module is disposed partially in the additional module; the additional module is disposed partially in the second additional module; and the second additional module is partially disposed in a third additional module or the second end module.

20. A vehicle seat, comprising the assembly according to any preceding embodiment; and one or more fluid bladders in fluid communication with the assembly.

Various examples/embodiments are described herein for various apparatuses, systems, and/or methods. Numerous specific details are set forth to provide a thorough understanding of the overall structure, function, manufacture, and use of the examples/embodiments as described in the specification and illustrated in the accompanying drawings. It will be understood by those skilled in the art, however, that the examples/embodiments may be practiced without such specific details. In other instances, well-known operations, components, and elements have not been described in detail so as not to obscure the examples/embodiments described in the specification. Those of ordinary skill in the art will understand that the examples/embodiments described and illustrated herein are non-limiting examples, and thus it can be appreciated that the specific structural and functional details disclosed herein may be representative and do not necessarily limit the scope of the embodiments.

Reference throughout the specification to "examples, "in examples," "with examples," "various embodiments," "with embodiments," "in embodiments," or "an embodiment," or the like, means that a particular feature, structure, or characteristic described in connection with the example/embodiment is included in at least one embodiment. Thus, appearances of the phrases "examples, "in examples," "with examples," "in various embodiments," "with embodiments," "in embodiments," or "an embodiment," or the like, in places throughout the specification are not necessarily all referring to the same embodiment. Furthermore, the particular features, structures, or characteristics may be combined in any suitable manner in one or more examples/embodiments. Thus, the particular features, structures, or characteristics illustrated or described in connection with one embodiment/example may be combined, in whole or in part, with the features, structures, functions, and/or characteristics of one or more other embodiments/examples without limitation given that such combination is not illogical or non-functional. Moreover, many modifications may be made to adapt a particular situation or material to the teachings of the present disclosure without departing from the scope thereof.

It should be understood that references to a single element are not necessarily so limited and may include one or more of such element. Any directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of examples/embodiments.

"One or more" includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first element could be termed a second element, and, similarly, a second element could be termed a first element, without departing from the scope of the various described embodiments. The first element and the second element are both element, but they are not the same element.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Joinder references (e.g., attached, coupled, connected, and the like) are to be construed broadly and may include intermediate members between a connection of elements, relative movement between elements, direct connections, indirect connections, fixed connections, movable connections, operative connections, indirect contact, and/or direct contact. As such, joinder references do not necessarily imply that two elements are directly connected/coupled and in fixed relation to each other. Connections of electrical components, if any, may include mechanical connections, electrical connections, wired connections, and/or wireless connections, among others. Uses of "e.g." and "such as" in the specification are to be construed broadly and are used to provide non-limiting examples of embodiments of the disclosure, and the disclosure is not limited to such examples.

While processes, systems, and methods may be described herein in connection with one or more steps in a particular sequence, it should be understood that such methods may be practiced with the steps in a different order, with certain steps performed simultaneously, with additional steps, and/or with certain described steps omitted.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

All matter contained in the above description or shown in the accompanying drawings shall be interpreted as illustrative only and not limiting. Changes in detail or structure may be made without departing from the present disclosure.

What is claimed is:

1. An assembly, comprising:
   a module including:
      a housing having a first portion, a second portion including a projection, and a first interior cavity; and
      a circuit board disposed at least partially in the first interior cavity; and
   an additional module connected under tension with the module, the additional module including:
      an additional housing having a recess and an additional interior cavity; and
      an additional circuit board disposed at least partially in the additional interior cavity;
   wherein the second portion of the housing is disposed at least partially in the additional interior cavity;
   the projection of the housing is disposed at least partially in the recess of the additional housing; and
   the circuit board is electrically connected to the additional circuit board.

2. The assembly of claim 1, wherein:
   the projection extends from a first side of the housing;
   the housing includes a second projection that extends from a second side of the housing; and
   the projection and the second projection include a ramped configuration.

3. The assembly of claim 1, wherein the housing includes a ramped portion to provide an interference fit with the additional housing.

4. The assembly of claim 3, wherein the projection is disposed on the ramped portion.

5. The assembly of claim 1, wherein the additional housing includes an additional housing first portion having the recess and an additional housing second portion having an additional housing projection.

6. The assembly of claim 1, wherein the additional housing includes a first sidewall and a second sidewall; and
   the first sidewall and the second sidewall of the additional housing include tapered edges.

7. The assembly of claim 6, wherein the first sidewall and the second sidewall of the additional module include an additional recess such that in an assembled configuration a gap/clearance is disposed between sections of adjacent modules.

8. The assembly of claim 1, wherein the housing of the module includes a track; and
the first portion of the additional housing includes a channel engaged with track such that relative movement of the module and the additional module is restricted in a lateral direction and a vertical direction.

9. The assembly of claim 1, wherein the module is a first end module;
   the assembly further comprises a second end module;
   the additional module is disposed at least partially between the first end module and the second end module;
   the second end module includes a second end module housing having a second end module recess and a second end module interior cavity; and
   the second end module is connected, at least indirectly, with the additional module.

10. The assembly of claim 9, wherein the first end module and the second end module are connected, at least indirectly, under tension with the additional module.

11. The assembly of claim 10, wherein the additional housing includes an additional housing first portion having the recess and an additional housing second portion having an additional housing projection; and
   the second portion of the additional housing is at least partially disposed in the second end module interior cavity.

12. The assembly of claim 9, including a second additional module connected under tension with one or both of the additional module and the second end module.

13. The assembly of claim 12, wherein the second additional module and the additional module are connected under tension via a pre-assembly offset between the projection of the additional module and a second additional module recess of the second additional module.

14. The assembly of claim 12, wherein the first end module, the additional module, and the second additional module are electrically connected.

15. The assembly of claim 14, wherein the first end module, the additional module, and the second additional module include respective fluid valves that are in fluid communication with each other.

16. The assembly of claim 12, wherein walls of the additional module and the second additional module include recessed portions that facilitate stretching.

17. The assembly of claim 16, wherein the additional module includes an additional module projection;
   the second additional module includes a second additional module recess; and
   a depth of the recessed portions corresponds to an offset of the additional module projection and the second additional module recess.

18. The assembly of claim 12, wherein:
   the second additional module includes a second additional module housing;
   the second additional module housing includes a first sidewall and a second sidewall; and
   the first sidewall and the second sidewall of the second additional module housing include tapered edges.

19. The assembly of claim 12, wherein the first end module is disposed partially in the additional module;
   the additional module is disposed partially in the second additional module; and
   the second additional module is partially disposed in a third additional module or the second end module.

20. A vehicle seat, comprising:
   the assembly of claim 1; and one or more fluid bladders in fluid communication with the assembly.

\* \* \* \* \*